United States Patent [19]

Sleder

[11] Patent Number: 4,830,213
[45] Date of Patent: May 16, 1989

[54] CLOSURE CAP FOR A FUEL RECEPTACLE

[75] Inventor: Richard L. Sleder, Fond du Lac, Wis.

[73] Assignee: Brunswick Corporation, Skokie, Ill.

[21] Appl. No.: 214,015

[22] Filed: Jun. 30, 1988

[51] Int. Cl.[4] ............................................. B65D 51/16
[52] U.S. Cl. ..................................... 220/203; 220/373; 220/DIG. 33; 220/367
[58] Field of Search ............... 220/202, 203, DIG. 33, 220/367, 373, 374

[56] References Cited

U.S. PATENT DOCUMENTS

| | | | |
|---|---|---|---|
| 4,113,138 | 9/1978 | Fields et al. | 220/367 |
| 4,165,816 | 8/1979 | Tupper | 220/203 |
| 4,168,012 | 9/1979 | Hawkinson | 220/209 |
| 4,666,058 | 5/1987 | Harris | 220/373 |

OTHER PUBLICATIONS

Brochure–Vernay Laboratories, Inc. (1985).

Primary Examiner—George T. Hall
Attorney, Agent, or Firm—Andrus, Sceales, Starke & Sawall

[57] ABSTRACT

The closure cap for fuel receptacle incorporates therein a liquid level gauge. The cap generally comprises annular hand grip means with a framing plate therein. The liquid level gauge includes an indicator shaft rotatable within an opening in the framing plate generally coaxial with the closure cap. The opening in the framing plate is in communication with the atmosphere and thus also serves to vent the receptacle when the cap is in closure position. Check valve means are carried on the shaft adjacent to and beneath the framing plate to normally close the opening and thereby prevent egress of sloshed fuel through the opening. The check valve means are adapted to open to vent the receptacle in response to a predetermined pressure differential across the valve means.

3 Claims, 1 Drawing Sheet

U.S. Patent
May 16, 1989
4,830,213
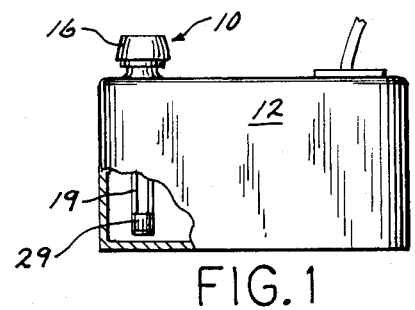
FIG. 1
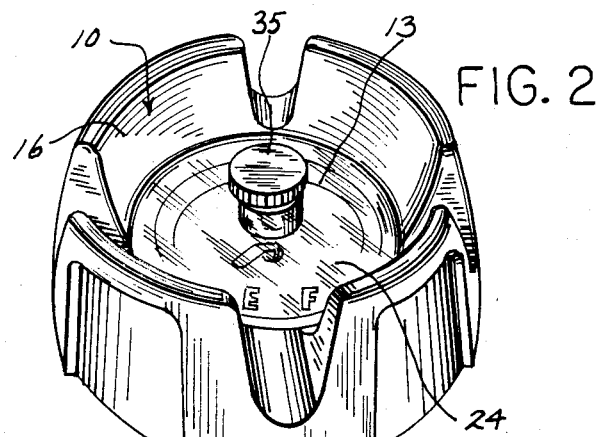
FIG. 2
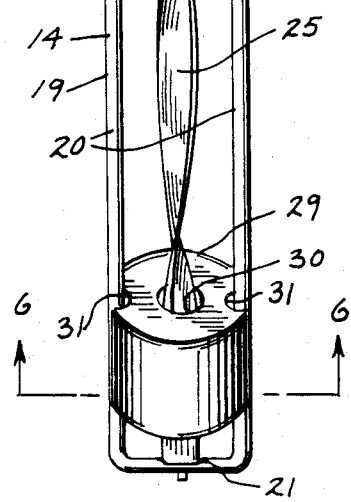
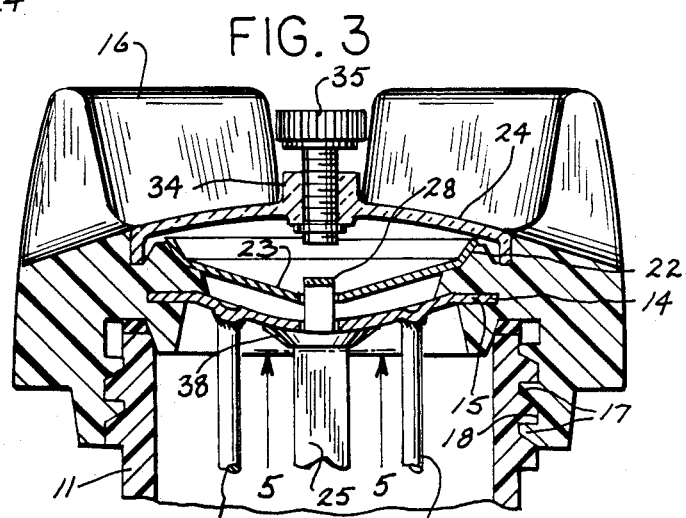
FIG. 3
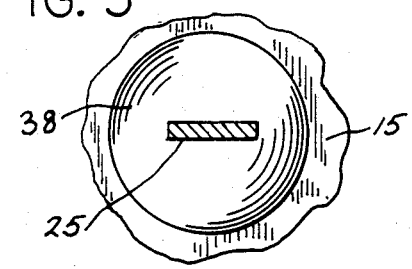
FIG. 5
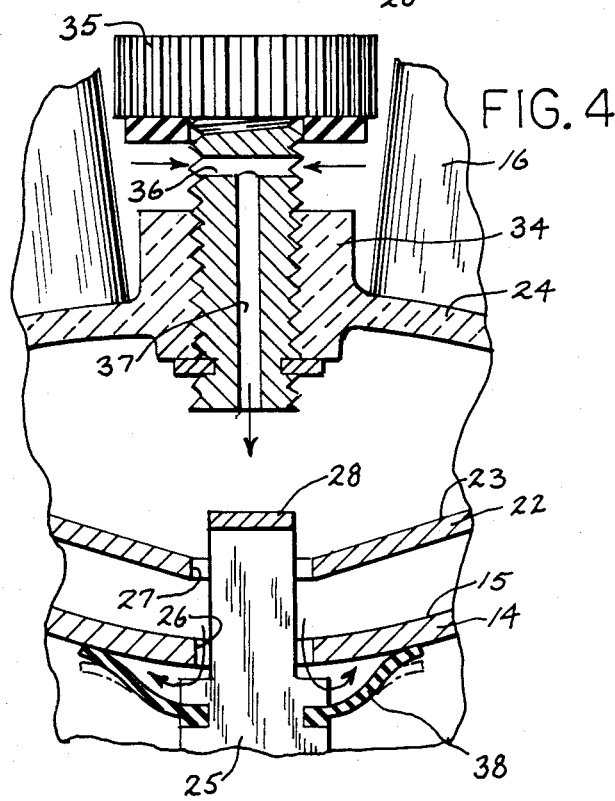
FIG. 4
FIG. 6

CLOSURE CAP FOR A FUEL RECEPTACLE

BACKGROUND FOR THE INVENTION

This invention relates to a closure cap for a fuel receptacle. More specifically the closure cap includes a fuel level gauge and a venting arrangement for the receptacle and the invention resides in the provision of check valve means to prevent egress of any sloshed fuel from the receptacle through the venting arrangement.

Fuel receptacles having no baffles therein can give rise to the sloshing of fuel therein under certain conditions. Unless somehow prevented, the fuel can be sloshed out by the receptacle through the venting arrangement to possibly give rise to a fire hazard.

Often the venting arrangement for a fuel receptacle is provided in the closure cap. To prevent the egress of sloshed fuel is perhaps somewhat further complicated when the cap additionally includes a fuel level gauge. It is generally an object of this invention to provide a fuel receptacle closure cap having a venting arrangement and a fuel level gauge with check valve means to prevent egress of sloshed fuel from the receptacle.

SUMMARY OF THE INVENTION

Broadly the invention resides in a cap assembly for a fuel receptacle having a filler neck. The cap assembly generally includes annular hand grip means. An insert plate is secured within the hand grip means. Beneath the insert plate the hand grip means is provided with means for sealingly engaging the cap assembly upon the filler neck to close the receptacle. The insert plate is provided with an opening generally coaxial of the cap assembly and exposed to the atmosphere. A liquid level gauge forms a part of the cap assembly inclusive of a shaft disposed rotatably in the insert plate opening. Check valve means are carried on the shaft adjacent to and beneath the insert plate to normally close the opening therein and thereby prevent egress of sloshed fuel from the receptacle through said opening.

BRIEF DESCRIPTION OF THE DRAWINGS

The drawings furnished herewith illustrate the best mode presently contemplated for carrying out the invention and are described hereinafter.

In the drawings:

FIG. 1 is an elevational view of a fuel receptacle with parts broken away and showing the closure cap of this invention;

FIG. 2 is a perspective view of the closure cap;

FIG. 3 is a sectional elevation of the upper portion of the closure cap shown threaded onto filler neck of the fuel receptacle;

FIG. 4 is an enlarged detail section of the upper central portion of the closure cap and shows the venting arrangement, incorporated therein for the fuel receptacle;

FIG. 5 is an enlarged sectional view taken generally on line 5—5 of FIG. 3; and

FIG. 6 is an enlarged sectional view taken generally on line 6—6 of FIG. 2.

DESCRIPTION OF THE ILLUSTRATED EMBODIMENT

Referring to the drawings, the cap 10 is provided for the closure of the filler opening or neck 11 of a fuel receptacle 12 and incorporates therein a liquid level gauge 13.

The frame 14 of the cap 10 includes the generally central insert plate 15 which is secured within the annular molded plastic hand grip member 16. The lower end portion of the hand grip member 16 is provided with internal threading 17 for engagement onto the external threading 18 on the filler neck 11 to effect closure of the receptacle 12.

The cap frame 14 further includes an elongated U-shaped member 19 that depends from the frame insert plate 15 and extends to the vicinity of the bottom of the receptacle 12 when the cap 10 is secured onto the filler neck 11. The opposed legs or columns 20 of the U-shaped member 19 generally parallel each other and are disposed symmetrically relative to the axis of the cap 10 and are connected at their lower end by the central leg 21.

Above the frame insert plate 15, the plastic hand grip member 16 supports a plate 22 having a dial face 23 thereon facing upwardly. The dial face 23 is exposed through a transparent lens or crystal 24 which is disposed above the dial face and is also secured interiorly of the annular hand grip member 16.

A rotatable indicator shaft 25 for the level gauge 13 is disposed axially of the cap 10 and between the opposed columns or legs 20 of the U-shaped member 19. The lower end of the shaft 25 is rotatably mounted in the central leg 21 of the U-shaped member 19. The upper end of the shaft 25 extends through and is rotatably disposed in there aligned openings 26 and 27 provided generally centrally in the frame insert plate 15 and the dial plate 22, respectively. Above the dial face 23 the upper end of the shaft 25 is bent over to provide an indicator projection or pointer 28 generally normal to the shaft.

When made of metal, the shaft 25 may be fabricated from sheet material such that the shaft width considerably exceeds the shaft thickness between the central leg 21 and the frame insert plate 15. Over its length, the shaft 25 is convoluted or twisted to provide a spiral or helical configuration as will be further described hereinafter.

A float member 29 is mounted on the indicator shaft 25. Generally centrally the float member 29 is provided with an axially extending hole 30 whose diameter somewhat exceeds the width of shaft 25 so that the shaft is freely rotatable within the float member. Float member 29 may be generally cylindrical as shown, with a diameter somewhat exceeding the distance between the opposed columns or legs 20 of the U-shaped member 19 and is provided with diametrically opposed, axially extending recesses 31 that open outwardly to slidably accommodate the opposed columns therein. With the columns 20 disposed in the opposed recesses 31, the float member 29 is rotationally restrained.

The bottom of the float member 29 carries a relatively thin plate chip 32 provided with a slot 33 as shown in FIG. 6. The slot 33 is axially aligned with the hole 30 in the float member 39 and slidably receives the shaft 25 such that the float member and shaft are rotationally interlocked. With the float member 29 being rotationally restrainted, its movement axially in accordance with the fill condition of the can or tank 12 effects a rotation of the convoluted shaft 25 by reason of the slotted clip 32 to effect corresponding angular movement of the indicator projection 28 which will provide a reading of the fill condition of the receptacle in accordance with suitable designation on the dial face 23.

For delivery of the liquid fuel directly to an engine, the receptacle 12 must be suitably vented and the cap 10 provides therefore. The lens or crystal 24 is formed with a boss 34 generally centrally thereof and a vent screw 35 is threadedly engaged in the boss and extends through the lens. With particular reference to FIG. 4, the vent screw 35 is provided with a diametrically extending through bore 36 exteriorly of the lens 24 and which is intercepted by the axially extending bore 37 which opens interiorly of the lens. Thus, air under atmospheric conditions finds its way interiorly of the lens 24 via the communication bores 36 and 37 as indicated by arrows in FIG. 4. Air under atmospheric conditions further finds it way into the receptacle 12 via the aligned holes 27 and 26 in the dial plate 22 and frame insert plate 15, respectively, as further indicated by arrows in FIG. 4.

Since the holes 26 and 27 in the frame plate 15 and dial plate 22, respectively, must be sufficiently generous in size so as to imposed miminal frictional resistance on the shaft 25, liquid fuel and fuel vapors resulting from sloshing in the receptacle 12 might pass upwardly through the holes and possibly give rise to a dangerous fire hazard. To preclude such passage of fuel and fuel vapors from the receptacle through the holes 26 and 27, respectively, an umbrella type check valve 38 is mounted on the shaft 25 adjacent to and beneath the frame insert plate 15 as best shown in FIGS. 4 and 5. The valve 38 is made of rubber or other suitable elastic material with the umbrella form opening upwardly and placing the periphery of the valve member in normally closed contact with the underside of the insert plate 15. As the umbrella-type check valve 38 rotates with the shaft 27, it provides effective closure of the opening 26 to generally preclude egress of possibly dangerous fuel and fuel vapors from the receptacle 12.

The umbrella-type check valve 38, however, will open for purposes of venting the receptacle 12 as indicated by the dot-dash line position and the arrows in FIG. 4. The valve 38 will crack open at a desired predetermined pressure differential across the valve member so that air at atmospheric pressure can displace the consumed fuel and thus preclude formation of a vacuum condition in the receptacle 12.

The invention thus provides a closure cap 10 for a fuel receptacle 12 that incorporates a fuel gauge 13 therein and also provides for venting of the receptacle. Check valve means 38 are further provided and associated with the fuel gauge 13 to prevent egress of possibly dangerous fuel and fuel vapors through the vent passages when open.

Various modes of carrying out the invention are contemplated as being within the scope of the following claims particularly pointing out and distinctly claiming the subject matter which is regarded as the invention.

I claim:

1. In a cap assembly for a fuel receptacle having a filler neck, said assembly including annular hand grip means, an insert plate secured within the hand grip means, means on the hand grip means beneath the insert plate for sealingly engaging the cap assembly upon the filler neck to close the receptacle, said insert plate having an opening therein generally coaxial with the cap assembly and exposed to the atmosphere, a liquid level gauge forming a part of the cap assembly inclusive of a shaft disposed coaxially of the cap assembly and rotatably in said opening, and check valve means carried on the shaft adjacent to and beneath the insert plate to normally close the insert plate opening and thereby prevent egress of sloshed fuel from the receptacle through said opening.

2. The construction of claim 1 wherein the check valve means carried on the shaft comprises an elastic umbrella valve member which peripherally engages with the underside of the insert plate to close said insert plate opening, said elastic valve member cracking open periodically to vent the receptacle.

3. The construction of claim 2 whrein the normally closed elastic umbrella valve member cracks open to vent the receptacle in response to a predetermined pressure differential across the valve member.

* * * * *